United States Patent
Kim et al.

(10) Patent No.: US 7,456,126 B2
(45) Date of Patent: Nov. 25, 2008

(54) ZIEGLER-NATTA CATALYST FOR OLEFIN POLYMERIZATION INCLUDING ARYLOXY GROUP AND METHOD FOR POLYMERIZATION OF OLEFIN USING SAME

(75) Inventors: Eun-il Kim, Yuseong-gu (KR); Ho-Sik Chang, Yuseong-gu (KR)

(73) Assignee: Samsung Total Petrochemicals Co., Ltd., Daesan-up Seosan-shi Chungcheongnam Province (KR)

( * ) Notice: Subject to any disclaimer, the term of this patent is extended or adjusted under 35 U.S.C. 154(b) by 8 days.

(21) Appl. No.: 10/595,272

(22) PCT Filed: Aug. 24, 2004

(86) PCT No.: PCT/KR2004/002127

§ 371 (c)(1),
(2), (4) Date: Sep. 22, 2006

(87) PCT Pub. No.: WO2005/049659

PCT Pub. Date: Jun. 2, 2005

(65) Prior Publication Data

US 2007/0179048 A1    Aug. 2, 2007

(30) Foreign Application Priority Data

Nov. 20, 2003    (KR) ............... 10-2003-0082478

(51) Int. Cl.
*C08F 4/64* (2006.01)
*C08F 4/642* (2006.01)

(52) U.S. Cl. ............... 502/115; 502/103; 502/104; 502/132; 526/124.2

(58) Field of Classification Search ............ 502/103, 502/104, 115, 132; 526/124.2
See application file for complete search history.

(56) References Cited

U.S. PATENT DOCUMENTS 6,677,266 B1 * 1/2004 De Rege Thesauro ....... 502/113
2007/0293710 A1 * 12/2007 Kim et al. ............... 585/500

FOREIGN PATENT DOCUMENTS

EP    0606125 A2    7/1994
JP    6340711    12/1994

OTHER PUBLICATIONS

Arjan Van Der Linden, et al., "Polymerization of a-Olefins and Butadiene and Catalytic Cyclotrimerization of 1-Alkynes by a New Class of Group IV Catalysts . . . ", J. Am. Chem. Soc. of the USA, 1995, pp. 3008-3021, No. 117.
Friedrich G. Sernetz, et al., "Copolymerization of Ethene with Styrene Using Methylaluminoxane-Activated Bis (phenolate) Complexes", Macromolecules, 1997, pp. 1562-1569.

* cited by examiner

*Primary Examiner*—Caixia Lu
(74) *Attorney, Agent, or Firm*—Barlow, Josephs & Holmes, Ltd.

(57) ABSTRACT

The present invention relates to a Ziegler-Natta catalyst for olefin polymerization and a method for polymerization of olefin using the same. Specifically, the invention relates to a Zeigler-Natta catalyst for olefin polymerization, which is produced by a method comprising the step of reacting a transition metal compound in which the transition metal having an oxidation number of 4 or more is selected from Groups IV, V or VI of the Periodic table and two or more aryloxy ligands are bound to the transition metal, with an organomagnesium compound, to reduce said transition metal compound to a reduced form in which the transition metal has an oxidation number of 3, and a method for polymerization of olefin using said catalyst.

2 Claims, No Drawings

ZIEGLER-NATTA CATALYST FOR OLEFIN POLYMERIZATION INCLUDING ARYLOXY GROUP AND METHOD FOR POLYMERIZATION OF OLEFIN USING SAME

TECHNICAL FIELD

The present invention relates to a Ziegler-Natta catalyst for olefin polymerization and a method for polymerization of olefin using the same. Specifically, the invention relates to a Ziegler-Natta catalyst for olefin polymerization, which is produced by a method comprising a step of reacting a transition metal compound in which the transition metal having an oxidation number of 4 or more is selected from Groups IV, V or VI of the Periodic table and two or more aryloxy ligands are bound to the transition metal, with an organomagnesium compound, to reduce said transition metal compound to a reduced form in which the transition metal has an oxidation number of 3, and a method for polymerization of olefin using said catalyst.

BACKGROUND ART

As to a method for polymerization of olefin using a transition metal compound as a catalyst for olefin polymerization, U.S. Pat. No. 4,894,424 discloses a method for producing an ethylene polymer and copolymer using a transition metal compound in which the transition metal has an oxidation number of 3 in Group IV of the Periodic table. The catalyst is produced by, as shown in Reaction Scheme 1, reduction of a transition metal compound in which the transition metal has an oxidation number of at least 4 in Groups IV, V or VI of the Periodic table, for example, a titanium compound having a general formula of $Ti(OR)_mCl_n$, with a Grignard compound having a formula of RMgCl which is obtained from magnesium (Mg) and an alkyl chloride (RCl).

Reaction Scheme 1.

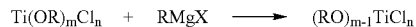

$Ti(OR)_mCl_n + RMgX \longrightarrow (RO)_{m-1}TiCl_n$ wherein, R represents $C_1$-$C_6$ alkyl; X represents a halogen atom; and m+n=4.

Since the catalyst is produced by reduction with a Grignard compound, 80% or more of titanium metal included in the catalyst exist in the from of $Ti^{3+}$, i.e. having an oxidation number of 3.

Recently, many attempts to make use of aryloxy ligand in a non-metallocene catalyst have been reported. As an example, a catalyst for olefin polymerization using a compound in which 1,1'-bi-2,2'-naphthoxy ligand is bound to a transition metal such as titanium or zirconium and derivatives thereof, is disclosed in p. 3008, vol. 117 of *J. Am. Chem. Soc.*; and a chelated catalyst for olefin polymerization which is produced by substituting a halide ligand in titanium and zirconium halide compound with a chelated phenoxy group, thereby being capable of producing a polymer having high molecular weight with a narrow molecular weight distribution, is disclosed in Japanese laid-open No. 340711 (Heisei-6) and EP Patent No. 0606125 A2; and a catalyst for ethylene polymerization using a titanium compound having a bisphenolato ligand as a main catalyst and methylaluminoxane (hereinafter, referred as MAO) as a co-catalyst, is disclosed in p. 5069, vol. 15 and p. 1562, vol. 30 of *Macromolecules*.

However, those conventional non-metallocene chelated catalysts for olefin polymerization using titanium and zirconium compounds as described above disadvantageously require the use of expensive MAO or boron compound as a co-catalyst, and they are not easily either produced or modified, due to their structure in which two aryloxy groups are linked to each other.

DISCLOSURE

With a view to solve the problems of prior arts as described above, therefore, it is an object of the present invention to provide an improved Ziegler-Natta catalyst for olefin polymerization by introducing two or more aryloxy ligands not linked to each other into the catalyst molecule, and a method for polymerization of olefin using the same. The catalyst of the present invention can be easily produced or modified while still taking advantages from introduction of the aryloxy ligands, and shows a significantly improved activity without using expensive MAO or boron compound as a co-catalyst, compared to conventional transition metal catalyst in which the transition metal has an oxidation number of 3 in Group IV of the Periodic table.

According to the present invention, provided is a Ziegler-Natta catalyst for olefin polymerization which is produced by a method comprising a step of reacting a transition metal compound having a general formula of $MX_{p-(q+r)}(OAr_1)_q(OAr_2)_r$ with an organomagnesium compound having a general formula of $MgX_{2-m}R_m$, wherein M represents a transition metal having an oxidation number of 4 or more, selected from Groups IV, V or VI of the Periodic table; X represents a halogen atom; $Ar_1$ and $Ar_2$ each represents substituted or unsubstituted aryl group of 6 to 30 carbon atoms, in which the $Ar_1$ and $Ar_2$ are not linked to each other; p represents the oxidation number of M of 4 or more; q and r satisfy $0 \leq q \leq p$, $0 \leq r \leq p$ and $2 \leq q+r \leq p$; R represents an alkyl group of 1 to 16 carbon atoms; and m satisfies $0 \leq m \leq 2$.

According to the present invention, further provided is a method for olefin polymerization, which comprises carrying out polymerization in the presence of a main catalyst which is a Ziegler-Natta catalyst produced by a method comprising a step of reacting a transition metal compound having a general formula of $MX_{p-(q+r)}(OAr_1)_q(OAr_2)_r$ with an organomagnesium compound having a general formula of $MgX_{2-m}R_m$, wherein M represents a transition metal having an oxidation number of 4 or more, selected from Groups IV, V or VI of the Periodic table; X represents a halogen atom; $Ar_1$ and $Ar_2$ each represents a substituted or unsubstituted aryl group of 6 to 30 carbon atoms, in which the $Ar_1$ and $Ar_2$ are not linked to each other; p represents the oxidation number of M of 4 or more; q and r satisfy $0 \leq q \leq p$, $0 \leq r \leq p$ and $2 \leq q+r \leq p$; R represents an alkyl group of 1 to 16 carbon atoms; and m satisfies $0 < m \leq 2$, and a co-catalyst which is an alkyl aluminum compound having a general formula of $AlR_nX_{(3-n)}$, wherein R represents an alkyl group of 1 to 16 carbon atoms; X represents a halogen atom; and n satisfies $1 \leq n \leq 3$.

Hereinafter, the Ziegler-Natta catalyst for olefin polymerization according to the present invention and the olefin polymerization method using the same are further described in detail.

According to one preferred embodiment, the present invention relates to a Ziegler-Natta catalyst for olefin polymerization, which is produced by reduction of a transition metal compound substituted with aryloxy groups in order to increase the catalyst activity, with an organomagnesium compound such as an organomagnesium chloride compound (RMgX) produced by Grignard reaction or organomagnesium (MgR$_2$), as represented by Reaction Scheme 2, and also relates to a method for a-olefin polymerization method using said catalyst.

Reaction Scheme 2

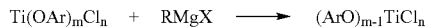

Ti(OAr)$_m$Cl$_n$ + RMgX ⟶ (ArO)$_{m-1}$TiCl$_n$ wherein, m+n=4; R represents an alkyl of C$_1$-C$_{16}$; Ar represents substituted or unsubstituted aryl of C$_6$-C$_{30}$.

One preferred embodiment of producing a Ziegler-Natta catalyst for olefin polymerization according to the present invention is described below.

The Ziegler-Natta catalyst for olefin polymerization according to the present invention is produced by reacting a transition metal compound having a general formula of MX$_{p-(q+r)}$(OAr$_1$)$_q$(OAr$_2$)$_r$ with an organomagnesium compound having a general formula of MgX$_{2-m}$R$_m$ in aliphatic hydrocarbon solvent such as heptane, in the presence of electron-donating compound such as tetrahydrofuran, ether and the like.

In said reaction, the reaction temperature is preferably in the range of 60-90° C., since when the reaction temperature is lower than 60° C., the reaction is not actively proceeded, and when the reaction temperature is higher than 90° C., the reaction efficiency is decreased.

As to the transition metal compound, M is a transition metal having an oxidation number of 4 or more in Groups IV, V or VI of the Periodic table, such as Ti, Zr, Hf, V, Nb, Ta, Cr, Mo, W and the like, preferably being Ti having an oxidation number of 4.

Further to the above transition metal compound, X is a halogen atom such as F, Cl, Br or I, preferably Cl, Br or I, and more preferably Cl.

Still further to the above transition metal compound, Ar$_1$ and Ar$_2$ which are aryloxy groups are incorporated into the transition metal compound to increase the catalyst activity. Particularly, Ar$_1$ and Ar$_2$ represent substituted or unsubstituted aryl group of 6 to 30 carbon atoms without being linked to each other, thus two or more aryloxy groups are incorporated into one molecule of the transition metal compound.

As to the organomagnesium compound, X is a halogen atom such as F, Cl, Br or I, preferably Cl or Br; R represents an alkyl group of 1 to 16 carbon atoms; and m satisfies 0<m≦2.

The organomagnesium compound can be obtained by reacting magnesium metal with an alkyl halide having a general formula of RX at −20-150° C., preferably at 60-90° C. In the formula RX, R and X represent the same as defined in the organomagnesium compound. The molar ratio of reactants is preferably as follows:

0.5≦the alkyl halide/the magnesium metal≦10 more preferably, 1≦the alkyl halide/the magnesium metal≦2.

The reaction between the transition metal compound and the organomagnesium compound is preferably carried out in the presence of an alkyl halide represented by a general formula of RX, wherein R and X represent the same as defined in the organomagnesium compound. The molar ratios of reactants are preferably as follow:

0.1≦the transition metal compound/the organomagnesium compound≦0.5 and

1≦the alkyl halide/the organomagnesium compound≦2; or 0.1≦the transition metal compound/the organomagnesium compound (MgR$_2$)≦0.5 and 2≦the alkyl halide/the organomagnesium compound (MgR$_2$)≦4.

As to the molar ratio of the transition metal compound/the organomagnesium compound, when the molar ratio is less than 0.1, polymerization activity cannot be obtained sufficiently, and when the molar ratio is more than 0.5, it is hard to control the reduction to a desired level.

Depending on the solvent used or other necessity, the organomagnesium compound can be used as a complex with the electron-donating compound such as ether.

The aliphatic hydrocarbon used in preparation of the catalyst includes hexane, heptane, propane, isobutane, octane, decane, kerosene and the like, and hexane or heptane is particularly preferred. The electron-donating compound used in preparation of the catalyst includes methyl formate, ethyl acetate, butyl acetate, ethyl ether, tetrahydrofuran, dioxane, acetone, methyl ethyl ketone and the like, and tetrahydrofuran or ether is particularly preferred.

In the olefin polymerization according to the present invention, the Ziegler-Natta catalyst of the present invention is used as a main catalyst, and the alkylaluminum compound represented by a general formula of AlR$_n$X$_{(3-n)}$ as a co-catalyst.

As to the alkylaluminum compound, R represents an alkyl group of 1 to 16, preferably 2 to 12 carbon atoms; X represents a halogen atom; and n satisfies 1≦n≦3, preferably n=3. Preferred alkyl aluminum compound includes triethylaluminum, trimethylaluminum, tri-n-propylaluminum, tri-n-butylaluminum, triisobutylaluminum, tri-n-hexylaluminum, tri-n-octylaluminum, tri-2-methylpentylaluminum and the like, particularly preferred are triethylaluminum, tri-n-hexylaluminum or tri-n-octylaluminum.

The alkylaluminum compound is preferably reacted with the following molar ratio, depending on the process characteristics of slurry, gas phase or solution process and desired polymer characteristics:

0.5≦the alkylaluminum compound/the transition metal compound≦500, and more preferably 10≦the alkylaluminum compound/the transition metal compound≦100.

As to the molar ratio of the alkylaluminum compound/the transition metal compound above, when the molar ratio is less than 0.5, polymerization activity cannot be obtained sufficiently, and when the molar ratio is more than 500, further improvement in polymerization activity is not obtained.

The polymerization in the present invention is generally carried out under the pressure of 15 bar or less and at the temperature of 40-150° C. The polymerization is carried out by adding ethylene and/or monomers possibly comprised of other olefins to a diluent such as a saturated aliphatic hydrocarbon. In the absence of the diluent, the polymerization can be carried out by directly contacting monomers in gas phase with the catalyst system. The polymerization is generally carried out in the presence of a chain growth inhibitor such as hydrogen, wherein the chain growth inhibitor is used in the range of 1~80 vol % of the olefin used in the reaction.

The catalyst system can be prepared in other alternative way. The catalyst, which is a solid catalyst comprised of a transition metal such as titanium, magnesium and a halogen atom, can be directly added into a polymerization reactor, or can be added into a reactor as a prepolymer prepared by prepolymerization of one or more olefins in inert solvent such as aliphatic hydrocarbons. The alkylaluminum compound as a co-catalyst can be directly added into the polymerization reactor.

MODE FOR INVENTION

Hereinafter, the present invention is further described in detail with reference to Examples and Comparative Examples, without restricting the scope of the present invention.

EXAMPLE 1

Catalyst Preparation 12.7 g (0.525 mol) of magnesium and 1.4 g (0.005 mol) of iodide were suspended in 450 ml of refined heptane in a 4-neck 1 L flask equipped with a mechanical stirrer. The temperature of the mixture was raised to 80° C., then 56.6 g (0.12 mol) of bis(2,6-diisopropylphenoxy)titanium dichloride dissolved in 150 ml of heptane was added to the mixture, and then thereto 84.1 ml (0.8 mol) of 1-chlorobutane was added dropwise at a constant rate. After completing the addition, further reaction for additional 2 hours was carried out to obtain a catalyst. The catalyst obtained was washed 4 times with sufficient amount of hexane, and then it was stored in refined hexane in the form of slurry. The result of the component analysis of the catalyst slurry was as follows:

Total amount of titanium in the slurry: 4.4 wt %,

Amount of titanium having an oxidation number of 3 in the total titanium: 75 wt %.

EXAMPLE 2

Catalyst Preparation 12.7 g (0.525 mol) of magnesium and 1.4 g (0.005 mol) of iodide were suspended in 600 ml of refined heptane in a 4-neck 1 L flask equipped with a mechanical stirrer. The temperature of the mixture was raised to 80° C., then 53.3 g (0.12 mol) of bis(2-methyl-6-tert-butylphenoxy)titanium dichloride dissolved in 150 ml of heptane was added to the mixture, and then thereto 84.1 ml (0.8 mol) of 1-chlorobutane was added dropwise at a constant rate. After completing the addition, further reaction for additional 2 hours was carried out to obtain a catalyst. The catalyst was washed 4 times with sufficient amount of hexane, and then it was stored in refined hexane in the form of slurry. The result of the component analysis of the catalyst slurry was as follows:

Total amount of titanium in the slurry: 5.9 wt %,

Amount of titanium having an oxidation number of 3 in the total titanium: 79 wt %.

COMPARATIVE EXAMPLE 1

Catalyst Preparation 12.7 g (0.525 mol) of magnesium and 1.4 g (0.005 mol) of iodide were suspended to 600 ml of refined heptane in a 4-neck 1 L flask equipped with a mechanical stirrer. The temperature of the mixture was raised to 80° C., then 15.2 ml (0.056 mol) of titanium propoxide and 7.2 ml (0.065 mol) of titanium tetrachloride were added to the mixture, and then thereto 84.1 ml (0.8 mol) of 1-chlorobutane was added dropwise at a constant rate. After completing the addition, further reaction for additional 2 hours was carried out to obtain a catalyst. The catalyst was washed 4 times with sufficient amount of hexane, and then it was stored in refined hexane in the form of slurry. The result of the component analysis of the catalyst slurry was as follows:

Total amount of titanium in the slurry: 7.3 wt %.

Amount of titanium having an oxidation number of 3 in the total titanium: 85 wt %.

EXAMPLE 3

Ethylene Polymerization 1000 ml of refined hexane was added into a 2 L stainless steel reactor equipped with a stirrer and a heating/cooling device, wherein the reactor had been sufficiently purged with pure nitrogen gas before use. Then, as a co-catalyst, 2 cc of tri-n-octylaluminum (TnOA) diluted in hexane to the concentration of 1.0 M was added into the reactor, and, as a main catalyst, 4.5 ml (6 mmol) of the catalyst slurry prepared in Example 1 was added into the reactor. The temperature of the reactor was raised to 80° C., then 66 psig of hydrogen was fed thereto, and then ethylene was fed enough to make the total pressure in the reactor 187 psig, and reaction was carried out while stirring at 1000 rpm. The polymerization reaction was carried out for 1 hour maintaining the reaction pressure of 187 psig constantly by feeding ethylene into the reactor continuously during the reaction. After completion of the reaction, approximately 10 cc of ethanol was added to stop the reaction by inhibiting the catalyst activity. The polymer obtained was separated by filtration, dried for a certain period of time to give 133.5 g of polyethylene.

EXAMPLE 4

Ethylene Polymerization

The polymerization was carried out in the same manner as described in Example 3, except that 4.5 ml (6 mmol) of the catalyst slurry prepared in Example 2 was used as a main catalyst. 48.8 g of polyethylene was obtained.

EXAMPLE 5

Ethylene Polymerization

The polymerization was carried out in the same manner as described in Example 3, except that 2 cc of triethylaluminum (TEA) diluted in hexane to the concentration of 1.0 M was used as a co-catalyst. 76.4 g of polyethylene was obtained.

EXAMPLE 6

Ethylene Polymerization

The polymerization was carried out in the same manner as described in Example 3, except that 4.5 ml (6 mmol) of the catalyst slurry prepared in Example 2 as a main catalyst and 2 cc of triethylaluminum (TEA) diluted in hexane to the concentration of 1.0 M as a co-catalyst were used. 73.8 g of polyethylene was obtained.

COMPARATIVE EXAMPLE 2

Ethylene Polymerization

The polymerization was carried out in the same manner as described in Example 3, except that 4.5 ml (6 mmol) of the catalyst slurry prepared in Comparative Example 1 as a main catalyst and 2 cc of triethylaluminum (TEA) diluted in hexane to the concentration of 1.0 M as a co-catalyst were used. 40.0 g of polyethylene was obtained.

Polymerization activity of the each catalyst system of Examples 3-6 and Comparative Example 2 and Melt Index and Bulk Density of the each polyethylene obtained from Examples 3-6 and Comparative Example 2 were measured. The results are shown in Table 1.

TABLE 1

Results of Ethylene Polymerization

| | Polymerization activity (kg PE) | Melt Index (g/10 minutes) | Bulk Density (g/cc) |
|---|---|---|---|
| Example 3 | 22.99 | 3.63 | 0.31 |
| Example 4 | 8.40 | 1.37 | 0.30 |
| Example 5 | 13.16 | 2.08 | 0.29 |
| Example 6 | 12.71 | 4.81 | 0.30 |
| Comparative Example 2 | 4.13 | 0.7 | 0.26 |

In Table 1, the polymerization activity was represented by the amount of polyethylene obtained from corresponding Example which was calculated in kg per gram of Ti in the catalyst, per polymerization time, and per reaction pressure.

The Melt Index was measured at 190° C. under the condition of 2.16 kg/10 minutes, according to ASTM D1238.

INDUSTRIAL APPLICABILITY

As seen from Table 1, the Ziegler-Natta catalyst produced by reacting a transition metal compound in which the transition metal has an oxidation number of 4 or more and aryloxy ligands are bound to the transition metal, with an organomagnesium compound to reduce said transition metal compound, shows increased polymerization activity as 2 to 5 times greater than the activity of the conventional catalyst. Additionally, according to the present invention, the bulk density, which is one of important properties in production process, is highly increased.

What is claimed is:

1. A method for preparing a Ziegler-Natta catalyst for olefin polymerization, which is produced by a method comprising a step of reacting a transition metal compound having a general formula of $MX_{p-(q+r)}(OAr_1)_q(OAr_2)_r$, with an organomagnesium compound having a general formula of $MgX_{2-m}R_m$, wherein M represents a transition metal having an oxidation number of 4 or more, selected from Groups IV, V or VI of the Periodic table; X represents a halogen atom; Ar1 and Ar2 each represents substituted or unsubstituted aryl group of 6 to 30 carbon atoms, in which the Ar1 and Ar2 are not linked to each other; p represents the oxidation number of M of 4 or more; q and r satisfy $0 \leq q \leq p$, $0 \leq r \leq p$ and $2 \leq q+r \leq p$; R represents an alkyl group of 1 to 16 carbon atoms; and m satisfies $0 < m \leq 2$.

2. The method according to claim 1, wherein the transition metal compound and the organomagnesium compound are reacted at 60~90° C. with a molar ratio of $0.1 \leq$ the transition metal compound/the organomagnesium compound $\leq 0.5$.

* * * * *